May 14, 1963 D. W. DUNN 3,089,968

NON-LINEAR AMPLIFIER

Filed June 22, 1961

INVENTOR.
DALE W. DUNN

BY [signature]

ATTORNEY 3,089,968
Patented May 14, 1963

3,089,968
NON-LINEAR AMPLIFIER

Dale W. Dunn, Van Nuys, Calif., assignor to General Precision, Inc., a corporation of Delaware Filed June 22, 1961, Ser. No. 118,848
3 Claims. (Cl. 307—88.5)

Figure 1:
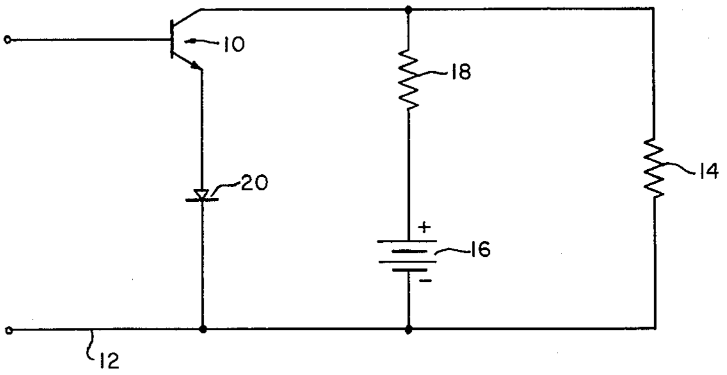

This invention relates to logarithmic circuitry and more particularly to novel and improved anti-logarithmic circuitry for producing an output signal with linear amplitude from an input signal having a logarithmic varying amplitude.

When electrical signals are used in analog computing application, it is often necessary to perform various arithmetic operations on the signals. These operations may include addition, subtraction, multiplication, division, extraction of roots and raising to powers. The addition or subtraction of a plurality of signals is easily accomplished and well known in the art; however, the instrumentation required to perform the other arithmetic functions is more difficult.

One method of multiplying or dividing two electrical signals is to introduce each of the signals into a logarithmic circuit which will produce an output proportional to the logarithm of the original signals. These logarithmic signals may then be added together and introduced into an anti-logarithmic circuit to obtain the product of the original signals, or may be subtracted and then introduced into an anti-logarithmic circuit to obtain the quotient of the original signals. Similarly, a signal may be raised to a certain power by first introducing it into a logarithmic circuit, amplifying the logarithmic signal to a value corresponding to the power, and then introducing the signal into an anti-logarithmic circuit which would produce an output corresponding to the desired value.

One object of this invention is to provide an anti-logarithmic circuit which will produce an output whose amplitude corresponds to the anti-logarithm of the amplitude of the signal at the input.

Another object of this invention is to provide a circuit that will produce output signal of linear amplitude from an input signal having a logarithmically varying amplitude.

It is well known that in a transistor amplifier having a common emitter configuration, the voltage gain of the transistor is proportional to the ratio of total collector resistance to total emitter resistance if that ratio is numerically less than the value of the beta characteristic of the transistor. In a transistor amplifier having a common emitter configuration, it can be seen, therefore, that if the value of the total emitter resistance logarithmically varies inversely with the voltage impressed across it, then the voltage gain of the transistor amplifier will be proportional to the anti-logarithm of the input signal applied to the base of the transistor. Semi-conductor diodes have the required logarithmic resistance characteristics when operated with very low voltages across them and when operated at a constant temperature. A single common emitter transistor amplifier can therefore be used as an anti-logarithmic device, provided the beta characteristic of the transistor is greater than the total resistance in the collector circuit divided by the total resistance of the semi-conductor diode, or diodes, in the emitter circuit. If a single diode is used in the emitter circuit, the amplifier will produce an anti-logarithmic output over a very narrow range since the diode maintains its logarithmic characteristics over a very narrow range of voltages. In order to expand the usable range of the logarithmic circuit, it is necessary to use a plurality of diodes in series in the emitter circuit. Since the characteristics of a diode vary greatly with varying temperature, it is very desirable to maintain the temperature of the diodes at a constant level with an oven or other suitable device.

Briefly described, the invention consists of a transistor amplifier connected in a common emitter configuration in which a resistance in the emitter circuit logarithmically varies inversely with the voltage impressed across it. The transistor amplifier will produce an output voltage that is proportional to the anti-logarithm of the input voltage provided the ratio of total resistance in the collector circuit to the total resistance in the emitter circuit is numerically less than the beta characteristic of the transistor.

Figure 2:
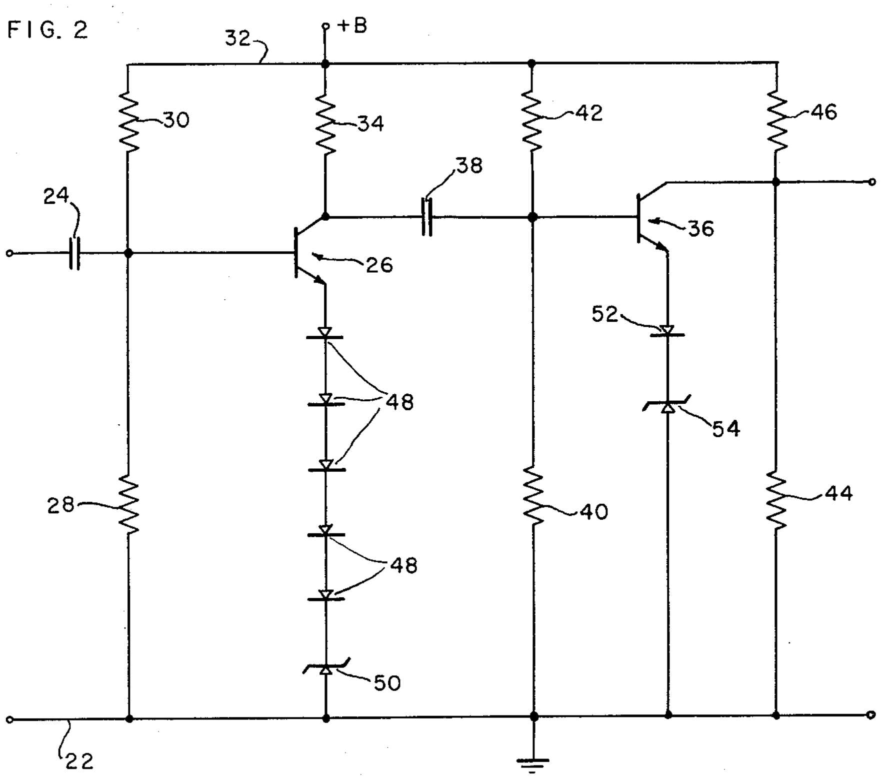

Other objects and advantages of this invention will become apparent when taken in conjunction with the accompanying things and drawings, in which:

FIGURE 1 is a simplified circuit diagram illustrating the principle of the invention, and FIGURE 2 is a diagram of an anti-logarithm circuit embodying the invention.

It is well known that in a transistor connected in a common emitter configuration, the voltage gain is proportional to the ratio of total collector resistance to total emitter resistance provided that the ratio is numerically less than the beta characteristic of the transistor. FIGURE 1 shows a simplified embodiment of the invention in which an NPN transistor amplifier is connected in a common emitter configuration. In the circuit of FIGURE 1 an input signal is applied between the base of transistor 10 and common line 12. The output signal is taken between the collector of transistor 10 and common line 12. The output load of the amplifier is represented by a resistance 14. Battery 16 in series with collector resistor 18 is connected between the collector of transistor 10 and common line 12 so that the negative terminal of battery 16 is connected to common line 12. Diode 20 is connected between the emitter of transistor 10 and common line 12.

When operated with a very low forward voltage, the resistance of a diode is very high and varies logarithmically with small changes in forward voltage. For example, manufacturer's typical characteristic curves of a type 1N457 diode shows that for a forward voltage of 0.60 volt the resistance of the diode is approximately 3500 ohms, whereas the same diode with a forward voltage of 0.7 volt has an approximate resistance of 500 ohms.

Since the voltage gain of the amplifier of FIGURE 1 is proportional to the total resistance in the collector circuit divided by the total resistance in the emitter circuit provided that ratio is numerically less than the beta characteristic of the transistor, the gain will be the total collector resistance which is the parallel value of the combination of the collector resistor 18 and the load resistance 14 divided by the resistance of diode 20. The resistance of diode 20 decreases logarithmically with increases in voltage across it and the voltage across diode 20 will increase with increased input signal voltages applied between common line 12 and the base of transistor 10. Linear increases in the input signal will therefore cause logarithmic decreases in the value of the emitter resistance and the voltage gain of the amplifier will increase logarithmically.

While the circuit of FIGURE 1 is a simplified embodiment of the invention, it will operate satisfactorily to produce an output signal proportional to the anti-logarithm of the input signal; however, its practical uses are limited because the logarithmic characteristic of the particular diode may only remain linear between forward voltage values of approximately 0.01 to 0.20 volt. Above this range the diode loses its logarithmic characteristic and is not suitable. A broader range of input voltages may be accomodated by the circuit shown in FIGURE 2. In this embodiment the input voltages may vary between 0.2 and 1.1 volts and will produce a voltage output that varies between 0.046 and 2.5 volts respectively, provided that the diodes are maintained at a constant temperature, which may be 85° C. In this circuit an A.C. input signal is introduced between common line 22 and one side of a coupling capacitance 24 which may have the value of 10 microfarads. The opposite terminal of capacitance 24 is coupled to the base of transistor 26 which may be a type 2N336. The base of transistor 26 is also coupled through a resistance 28, which may have a value of 5260 ohms, to common line 22, and is also coupled through a resistance 30, which may have a value of 42.1 kilohms, to a +B line 32 which may be at a potential of 21.6 volts above the potential of common line 22. The collector of transistor 26 is also coupled to the +B line through a resistance 34 which may have a value of 6 kilohms. The collector of transistor 26 is also coupled to the base of transistor 36 through a coupling capacitance 38 which may have a value of 10 microfarads. The base of transistor 36, which may be a type 2N336, is coupled to common line 22 through a resistance 40, which may have a value of 19.2 kilohms, and is also coupled to +B line 32 through a resistance 42 which may have a value of 50 kilohms. The collector of transistor 36 is coupled to common line 22 through a resistance 44, which may have a valve of 220 kilohms, and is also coupled to +B line 32 through a resistance 46 which may have a value of 2 kilohms. The output signal of the circuit is taken between common line 22 and the collector of transistor 36.

In order to provide a logarithmically varying resistance in the emitter circuit of transistor 26 that will accommodate a relatively large range of input voltages to the circuit, 5 diodes and a zener diode are connected in series between the emitter of transistor 26 and common line 22. In order to provide proper logarithmic linearity, it has been found that diodes 48 may be comprised of two type 1N300 diodes and three type 1N628 diodes. Zener diode 50 which may be a type 1N747, is not essential to the proper functioning of the circuit but is desirable in order to prevent current flow in the emitter circuit until the zener voltage is reached. At this zener voltage all of the diodes 48 will operate to present a logarithmically varying resistance in the emitter circuit which will control the linearity of the output of transistor 26.

The emitter of transistor 36 is coupled through a diode 52, which may be a type 1N300, to common line 22. Diode 52 operates in the same manner as previously described to control the linearity of the output signal at the collector of transistor 36. A zener diode 54, which may be a type 1N747 may be connected in series with diode 52 to prevent current flow in the emitter circuit of transistor 36 until the zener voltage is reached.

The linearity of the circuit shown in FIGURE 2 is primarily controlled by the action of transistor 26. As has been previously mentioned, the voltage gain of the circuit is proportional to the total resistance in the collector circuit to the total resistance in the emitter circuit provided that ratio is numerically less than the beta characteristic of the transistor. The total resistance in the collector circuit of transistor 26 is the total parallel value of the combination of resistance 34, resistance 40, resistance 42, and the beta value of transistor 36 times the total series resistance of diode 52 in the emitter circuit of the transistor 36. Any resistance that is presented by the voltage source or battery connected between +B line 32 and common line 22 is very small and may be neglected in the computation. The total resistance in the emitter circuit of transistor 26 is the series total resistance of the diodes 48 which logarithmically vary in resistance as the input voltage varies. Since the beta characteristic of the type 2N336 transistor is approximately 100, it can be shown that the ratio of total collector resistance to the total emitter resistance is numerically less than the beta characteristic, and the output of the circuit is proportional to that resistance ratio.

In the embodiment described, it is assumed that the anti-logarithmic circuit is to be used with A.C. signals. If it is desired to introduce a D.C. signal, it will be necessary to remove coupling capacitances 24 and 38 and to make suitable changes in the values of some of the resistances.

It is to be understood that a wider range of input voltages may be accommodated by inserting additional diodes in the emitter circuit of transistor 26 and other modifications may be made without departing from the spirit of the invention.

I claim:

1. Anti-logarithmic circuitry comprising: a transistor having a base, collector, an emitter; a common line common to the input and output of the anti-logarithm circuitry; signal input means coupled to the base of said transistor; varying emitter circuit resistance means coupled between the emitter of said transistor and said common line, said resistance means comprising at least one semiconductor diode in which the resistance decreases logarithmically with increase in voltage applied across it; and collector circuit means including output circuitry and voltage potential circuitry coupled between the collector of said transistor and said common line, said collector circuit means having a total circuit resistance of less than a product of said varying emitter circuit resistance means and the beta characteristic of said transistor whereby said transistor will produce an output signal proportional to the ratio of total circuit resistance in said collector circuit means to said varying emitter circuit resistance means and proportional to the anti-logarithm of the signal introduced to said signal input means.

2. An anti-logarithmic amplifier comprising: a transistor amplifier having a common emitter configuration, varying resistance means coupled between the emitter element of the transistor in said transistor amplifier and a common line that is common to the input and output of said transistor amplifier, said varying resistance means comprising at least one semi-conductor diode in which the resistance decreases logarithmically with increase in voltage applied across it, and collector circuit means including output circuitry and voltage potential circuitry coupled between the collector of the transistor in said transistor amplifier and said common line, said collector circuit means having a total circuit resistance of less than the product of said varying resistance means and the beta characteristic of said transistor.

3. Amplifier circuitry for producing a linear output signal from a logarithmic input signal comprising: a transistor having a base, collector and emitter, a common line common to the input and to the output of the amplifier circuit, logarithmic varying resistance means coupled between the emitter of said transistor and said common line, said logarithmic varying resistance means having the property of logarithmically decreasing its resistance with increase in voltage potential applied across it, and collector circuit means including output circuit means and voltage potential means coupled between the collector of said transistor and said common line, said collector circuit means having a total circuit resistance of less than the product of said logarithmic varying resistance means and the beta characteristic of said transistor.

References Cited in the file of this patent

UNITED STATES PATENTS

| | | |
|---|---|---|
| 2,861,182 | Green | Nov. 18, 1958 |
| 2,972,684 | Elliot et al. | Feb. 21, 1961 |
| 3,041,553 | Boreen | June 26, 1962 |